US011064189B2

(12) United States Patent
Lu et al.

(10) Patent No.: US 11,064,189 B2
(45) Date of Patent: Jul. 13, 2021

(54) NAKED-EYE THREE-DIMENSIONAL DISPLAY METHOD, NAKED-EYE THREE-DIMENSIONAL DISPLAY DEVICE AND TERMINAL EQUIPMENT

(71) Applicant: BOE Technology Group Co., Ltd., Beijing (CN)

(72) Inventors: Pengcheng Lu, Beijing (CN); Xiaochuan Chen, Beijing (CN); Shengji Yang, Beijing (CN); Lei Wang, Beijing (CN); Dongni Liu, Beijing (CN); Han Yue, Beijing (CN); Li Xiao, Beijing (CN); Jie Fu, Beijing (CN); Jian Gao, Beijing (CN); Changfeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 334 days.

(21) Appl. No.: 16/075,746

(22) PCT Filed: Jan. 3, 2018

(86) PCT No.: PCT/CN2018/070102
§ 371 (c)(1),
(2) Date: Aug. 6, 2018

(87) PCT Pub. No.: WO2018/233275
PCT Pub. Date: Dec. 27, 2018

(65) Prior Publication Data
US 2019/0268589 A1    Aug. 29, 2019

(30) Foreign Application Priority Data
Jun. 22, 2017    (CN) .......................... 201710481939.8

(51) Int. Cl.
*H04N 13/383* (2018.01)
*H04N 13/302* (2018.01)
(Continued)

(52) U.S. Cl.
CPC .......... *H04N 13/383* (2018.05); *G02B 30/26* (2020.01); *G09G 3/003* (2013.01); *G09G 3/3208* (2013.01);
(Continued)

(58) Field of Classification Search
CPC ........................... H04N 13/383; G02B 27/225
See application file for complete search history.

(56) References Cited

U.S. PATENT DOCUMENTS 4,897,715 A *   1/1990   Beamon, III ........ G02B 26/105
                                                       345/8
2007/0109657 A1   5/2007   Yoon
(Continued)

FOREIGN PATENT DOCUMENTS

CN        101742347 A     6/2010
CN        104202591 A    12/2014
(Continued)

OTHER PUBLICATIONS

English translation of International Search Report and Written Opinion for International Application No. PCT/CN2018/070102, dated Mar. 30, 2018, 12 pages.

*Primary Examiner* — Jerry T Jean Baptiste
(74) *Attorney, Agent, or Firm* — Westman, Champlin & Koehler, P.A.

(57) ABSTRACT

A naked-eye three-dimensional display method constructed on two half-screens, a naked-eye three-dimensional display device, and a terminal equipment are provided in embodiments of the disclosure, the two half-screens being config-
(Continued)

ured to display respectively images corresponding to a left eye and a right eye of an observer respectively, the method comprising: detecting in a real-time manner distances between both ends of each row of pixels on each of the half-screens and a corresponding eye of the observer through which said each of the half-screens is viewed; calculating light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed; and controlling light rays outputted from the displayed pixels to the corresponding eye through which said each of the half-screens is viewed, with a collimated light adjusting device, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed.

17 Claims, 13 Drawing Sheets

(51) Int. Cl.
G09G 3/3208 (2016.01)
G09G 3/36 (2006.01)
G09G 3/00 (2006.01)
G02B 30/26 (2020.01)

(52) U.S. Cl.
CPC ............ *G09G 3/36* (2013.01); *H04N 13/302* (2018.05); *G09G 2320/0209* (2013.01); *G09G 2320/068* (2013.01); *G09G 2354/00* (2013.01)

(56) References Cited

U.S. PATENT DOCUMENTS

| | | | |
|---|---|---|---|
| 2007/0159525 A1 | 7/2007 | Tomisawa et al. | |
| 2013/0278631 A1* | 10/2013 | Border | G02C 5/143 345/633 |
| 2014/0063602 A1* | 3/2014 | Wu | H04N 13/31 359/464 |
| 2014/0146091 A1* | 5/2014 | Kang | H04N 13/366 345/690 |
| 2014/0176528 A1 | 6/2014 | Robbins | |
| 2017/0248747 A1* | 8/2017 | Kim | G03H 1/2286 |

FOREIGN PATENT DOCUMENTS

| | | |
|---|---|---|
| CN | 104506836 A | 4/2015 |
| CN | 104714305 A | 6/2015 |
| CN | 104871068 A | 8/2015 |
| CN | 107092097 A | 8/2017 |
| DE | 196 13 618 A1 | 10/1997 |
| JP | 2003-535558 A | 11/2003 |
| JP | 2006-201517 A | 8/2006 |

* cited by examiner detecting in a real-time manner distances between both ends of each row of pixels on each of the half-screens and a corresponding eye through which said each of the half-screens is viewed — S201 determining distances between the displayed pixels in each row of pixels on each of the half-screens and the axis, i.e., distances between each row of the displayed pixels on each of the half-screens and projection points of the central axis O on each row of the displayed pixels — S202 calculating distances between the displayed pixels in each row of pixels on each of the half-screens and the corresponding eye through which said each of the half-screens is viewed, as a function of the length of the half-screen, the distances between both ends of each row of pixels on each of the half-screens and the corresponding eye through which said each of the half-screens is viewed, and the distances between the displayed pixels in each row of pixels on each of the half-screens and the axis — S203 calculating light-exiting angles formed from displayed pixels in each row of pixels on said each of the half-screens to the corresponding eye through which said each of the half-screens is viewed, as a function of the distances between the displayed pixels in each row of pixels on each of the half-screens and the corresponding eye through which said each of the half-screens is viewed — S204 controlling light rays outputted from the displayed pixels to the corresponding eye through which said each of the half-screens is viewed, with a collimated light adjusting device, according to the light-exiting angles formed from the displayed pixels on said each of the half-screens to the corresponding eye through which said each of the half-screens is viewed, so as to focus displayed contents of the first half-screen onto the right eye and to focus displayed contents of the second half-screen onto the left eye — S205

Fig. 10

NAKED-EYE THREE-DIMENSIONAL DISPLAY METHOD, NAKED-EYE THREE-DIMENSIONAL DISPLAY DEVICE AND TERMINAL EQUIPMENT

CROSS-REFERENCE TO RELATED INVENTION

This application is a Section 371 National Stage Application of International Application No. PCT/CN2018/070102, filed on Jan. 3, 2018, entitled "NAKED-EYE THREE-DIMENSIONAL DISPLAY METHOD, NAKED-EYE THREE-DIMENSIONAL DISPLAY DEVICE AND TERMINAL EQUIPMENT", which has not yet published, which claims priority to Chinese Patent Application Invention No. 201710481939.8 filed on Jun. 22, 2017 in the State Intellectual Property Office of China, the whole disclosure of which is incorporated herein by reference.

BACKGROUND OF THE DISCLOSURE

Field of the Disclosure

Embodiments of the present disclosure relate to a field of three-dimensional display technology, and in particular, to a naked-eye three-dimensional display method, a naked-eye three-dimensional display device, and a terminal equipment.

Description of the Related Art

With a development of since and technology, three-dimensional (abbreviated as 3D) display technology has been used more and more widely in fields of education, exhibition, entertainment, audio and video, and the like. A primary principle of the 3D display technology lies in that, images at different viewing angles may be received respectively by left and right eyes of an observer, and then the images received by the left eye and the right eye respectively may be analyzed and then processed by superposition therebetween by brain, so as to obtain a stereoscopic visual effect.

At present, a common implementation of the naked-eye 3D display technology lies in that, a naked-eye 3D display may be realized by a light-splitting element (such as a parallax barrier, and the like), by displaying visual information of frames of different views which are made alternate and interweaving with each other for both eyes respectively, on one and the same screen.

SUMMARY OF THE DISCLOSURE

The embodiments of the present disclosure have been made to overcome or alleviate at least one aspect of the above mentioned disadvantages and/or shortcomings in the prior art, by providing a naked-eye three-dimensional display method, a naked-eye three-dimensional display device, as well as a terminal equipment.

According to an aspect of the exemplary embodiment of the present disclosure, there is provided a naked-eye three-dimensional display method constructed on two half-screens, which are configured to display respectively images corresponding to a left eye and a right eye of an observer respectively, the method comprising:

detecting in a real-time manner distances between both ends of each row of pixels on each of the half-screens and a corresponding eye of the observer through which said each of the half-screens is viewed;

calculating light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed; and controlling light rays outputted from the displayed pixels to the corresponding eye through which said each of the half-screens is viewed, with a collimated light adjusting device, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed.

According to an embodiment of the disclosure, the half-screens are pivotable around a same axis, respectively.

According to an embodiment of the disclosure, the collimated light adjusting device comprises one of a liquid crystal prism and a micro-electromechanical system.

According to an embodiment of the disclosure, detecting in a real-time manner distances between both ends of each row of pixels on each of the half-screens and a corresponding eye of the observer through which said each of the half-screens is viewed comprising:

detecting distances between both ends of each row of pixels on a first half-screen and the right eye, by position sensors preset at both ends of each row of pixels on the first half-screen; and detecting distances between both ends of each row of pixels on a second half-screen and the left eye, by position sensors preset at both ends of each row of pixels on the second half-screen.

According to an embodiment of the disclosure, calculating light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed comprising:

determining distances between the displayed pixels in each row of pixels on each of the half-screens and the axis;

calculating distances between the displayed pixels in each row of pixels on each of the half-screens and the corresponding eye through which said each of the half-screens is viewed, as a function of the length of the half-screen, the distances between both ends of each row of pixels on each of the half-screens and the corresponding eye through which said each of the half-screens is viewed, and the distances between the displayed pixels in each row of pixels on each of the half-screens and the axis;

calculating light-exiting angles formed from displayed pixels in each row of pixels on said each of the half-screens to the corresponding eye through which said each of the half-screens is viewed, as a function of the distances between the displayed pixels in each row of pixels on each of the half-screens and the corresponding eye through which said each of the half-screens is viewed.

According to an embodiment of the disclosure, the method further comprises:

adjusting a pivotal angle of the half-screen, in response to detecting that the corresponding eye is moved to a position corresponding to a limit range of an optical path at a current pivotal angle of the half-screen; and re-calculating the light-exiting angles formed from displayed pixels to the corresponding eye through which said each of the half-screens is viewed.

According to an embodiment of the disclosure, each of the displayed pixels comprises one kind of a unit pixel, and sub-pixels in the unit pixel.

According to another aspect of the exemplary embodiment of the present disclosure, there is provided a naked-eye three-dimensional display device, comprising:

a display screen, which comprises a first half-screen and a second half-screen configured to display images respectively which are to be received by a left eye and a right eye of an observer respectively, a detecting circuit, configured to detect in a real-time manner distances between both ends of each row of pixels on each of the half-screens and a corresponding eye of the observer through which said each of the half-screens is viewed;

a calculating circuit, configured to calculate light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed an adjusting device, configured to control light rays outputted from the displayed pixels to the corresponding eye through which said each of the half-screens is viewed, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed.

According to an embodiment of the disclosure, the display screen is divided into the first half-screen and the second half-screen by an axis provided on the display screen, and the first half-screen and the second half-screen are pivotable around the axis, respectively.

According to an embodiment of the disclosure, the adjusting device comprises a collimated light adjusting device.

According to an embodiment of the disclosure, the collimated light adjusting device comprises one of a liquid crystal prism and a micro-electromechanical system.

According to an embodiment of the disclosure, the detecting circuit is further configured:

to detect distances between both ends of each row of pixels on the first half-screen and the right eye, by position sensors preset at both ends of each row of pixels on the first half-screen; and to detect distances between both ends of each row of pixels on the second half-screen and the left eye, by position sensors preset at both ends of each row of pixels on the second half-screen.

According to an embodiment of the disclosure, the calculating circuit comprises:

a determining circuit, configured to determine distances between the displayed pixels in each row of pixels on each of the half-screens and the axis;

a first calculating sub-circuit, configured to calculate distances between the displayed pixels in each row of pixels on each of the half-screens and the corresponding eye through which said each of the half-screens is viewed, as a function of the length of the half-screen, the distances between both ends of each row of pixels on each of the half-screens and the corresponding eye through which said each of the half-screens is viewed, and the distances between the displayed pixels in each row of pixels on each of the half-screens and the axis;

a second calculating sub-circuit, configured to calculate light-exiting angles formed from displayed pixels in each row of pixels on said each of the half-screens to the corresponding eye through which said each of the half-screens is viewed, as a function of the distances between the displayed pixels in each row of pixels on each of the half-screens and the corresponding eye through which said each of the half-screens is viewed.

According to an embodiment of the disclosure, the adjusting device is further configured to adjust a pivotal angle of the first half-screen or the second half-screen, in response to detecting that the corresponding eye is moved to a position corresponding to a limit range of an optical path at a current pivotal angle of the first half-screen or the second half-screen; and the calculating circuit is further configured to re-calculate the light-exiting angles formed from the displayed pixels to the corresponding eye through which the first half-screen or the second half-screen is viewed.

According to an embodiment of the disclosure, the first half-screen and the second half-screen are arranged symmetrically about the axis.

According to an embodiment of the disclosure, the display screen comprises one of a LCD display screen and a flexible OLED display screen.

According to yet another aspect of the exemplary embodiment of the present disclosure, there is provided a terminal equipment, comprising:

a housing; and a processor, a memory and a naked-eye three-dimensional display device which are located within the housing, wherein the processor is configured to run programs corresponding to executable program codes stored in the memory, by reading the executable program codes, so as to control the naked-eye three-dimensional display device to implement the naked-eye three-dimensional display method as above.

According to an embodiment of the disclosure, the naked-eye three-dimensional display device comprises:

a display screen, which comprises a first half-screen and a second half-screen configured to display images respectively which are to be received by a left eye and a right eye of an observer respectively, a detecting circuit, configured to detect in a real-time manner distances between both ends of each row of pixels on each of the half-screens and a corresponding eye of the observer through which said each of the half-screens is viewed;

a calculating circuit, configured to calculate light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed an adjusting device, configured to control light rays outputted from the displayed pixels to the corresponding eye through which said each of the half-screens is viewed, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed.

A portion of additional aspects and advantages of embodiments of the disclosure may be provided in following depictions, while other portions may become apparent from following depictions or become known according to practice of the embodiments of the disclosure.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which:

FIG. 10 illustrates a flow chart of a naked-eye 3D display method according to another embodiment of the disclosure;

DETAILED DESCRIPTION OF PREFERRED EMBODIMENTS OF THE DISCLOSURE

Figure 1A:
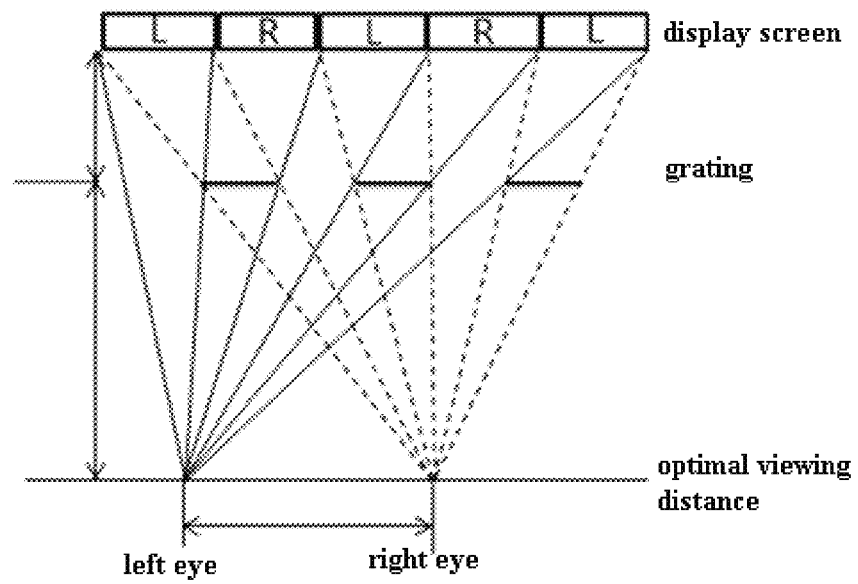
FIGS. 1(a)-1(c) illustrate a schematic view of a 3D display effect produced by a parallax barrier in the relevant art.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of a naked-eye three-dimensional display device, and a terminal equipment.

In order to ensure that technical solutions of the embodiments of the disclosure may be understood readily and better by those skilled in the art, a naked-eye three-dimensional display method, a naked-eye three-dimensional display device, and a terminal equipment according to embodiments of the disclosure may be described in detail hereinafter by referring to the drawings.

Specifically, when a 3D display is implemented in a display mode with a parallax barrier, a light emitted by a backlight module is blocked by the parallax barrier which is located in front of a display screen and configured to function as a slit grating, so as to form alternately bright and dark fringes Furthermore, when an observer is located at an optimal viewing distance which is determined as a function of a width of the grating and positions of pixels in 3D views displayed on the display screen, different pixels of the views may be received through the left eye and the right eye of the observer respectively. Finally, the pixels of the views received by the left eye and the right eye respectively may be analyzed and then processed by superposition therebetween by the brain of the observer, so as to generate a visual feeling of layering of frames of images represented as the views which is perceivable by the observer; as such, a stereoscopic impression may be produced thereby.

However, in a condition that a current viewing distance (which is defined as a normal distance between a plane in which the eyes of the observer are located and a plane in which the display screen is located) of the observer changes, i.e., in a condition that the current viewing distance deviates from the optimal viewing distance determined by both the width of the grating and positions of pixels in the views displayed on the display screen at present, then, the current viewing distance does not match perfectly any more with both the width of the grating and positions of pixels in the views displayed on the display screen at present, resulting in at least a partial overlapping between the pixels received by the left eye and the pixels received by the right eye of the observer, in the views, and in turn resulting in an image crosstalk phenomenon. In addition, in such a display mode, it is required to consider a compromise between a demand of displaying naked-eye 3D frames received respectively by the left eye and by the right eye, on one and the same screen, completely separately from each other depending on respective timing sequences, and a demand of a viewing angle as large as possible when the observer views continuously or uninterruptedly.

As illustrated in FIG. 1(a), in a condition that the observer is located at the optimal viewing distance which is determined according to a current width of the grating and positions of pixels in 3D views displayed on the display screen, pixels of the views labeled by 'L' are received by the left eye, and pixels of the views labeled by 'R' are received by the right eye, and then all the pixels of the views which are received are analyzed and then processed by superposition therebetween by the brain of the observer, such that a visual feeling of layering of frames of images represented as the views may be perceivable by the observer, and a stereoscopic impression is produced thereby.

Figure 1B:
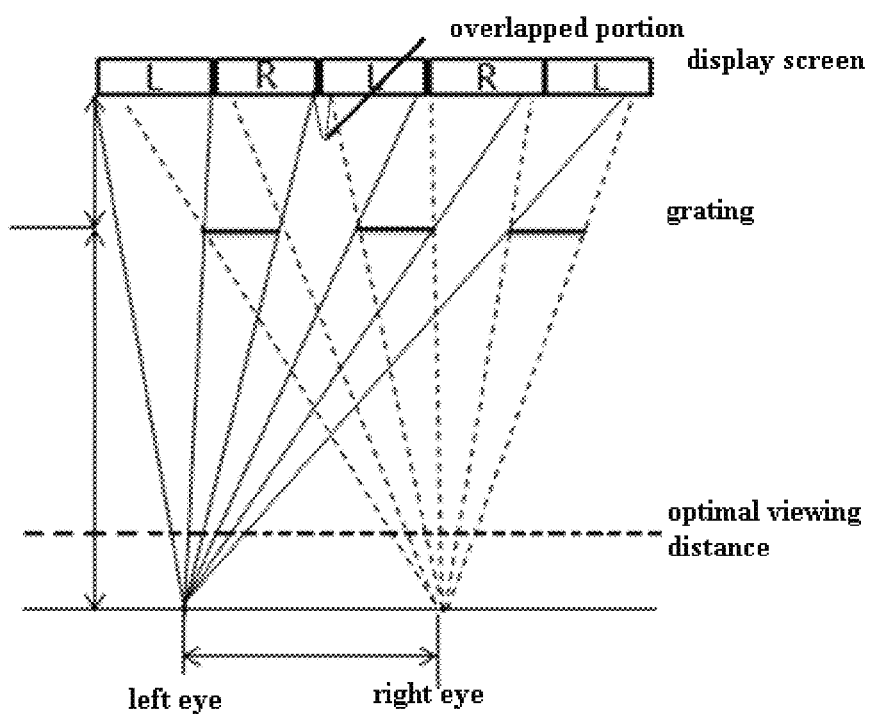

As illustrated in FIG. 1(b), in a condition that a viewing distance of the observer is changed into another distance which is relatively larger than the optimal viewing distance, then, in the views, the pixels received by the left eye and the pixels received by the right eye of the observer at least partially overlap with each other (in FIG. 1(b), only one overlapping is illustrated exemplarily), resulting in an image crosstalk phenomenon.

Figure 1C:
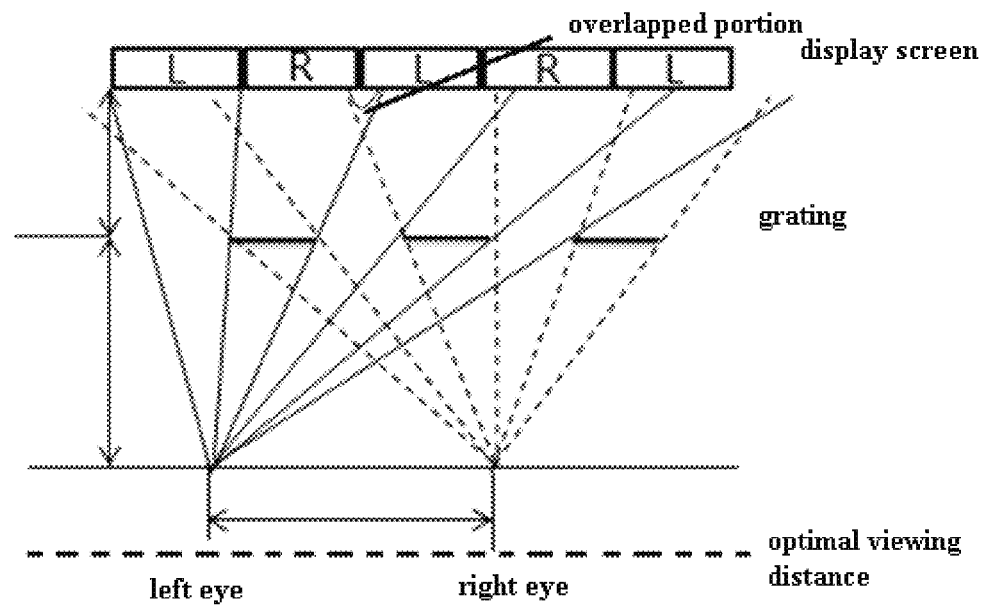

As illustrated in FIG. 1(c), in a condition that a viewing distance of the observer is changed into another distance which is relatively smaller than the optimal viewing distance, then, in the views, the pixels received by the left eye and the pixels received by the right eye of the observer also at least partially overlap with each other (in FIG. 1(c), only one overlapping is illustrated exemplarily), resulting in an image crosstalk phenomenon.

In order to solve above problems, a naked-eye three-dimensional display method is provided in embodiments of the disclosure, which avoids the crosstalk during display with a relatively low cost and an improved comfort of the observer in use, by extending a viewing angle when the observer views continuously or uninterruptedly.

The method may be applied in, e.g., two half-screens; for example, it may be applied in a display screen which may be divided along its own central axis into two half-screens each of which is pivotable symmetrically around the central axis; in the two half-screens, a left half-screen displays image frames required by the right eye and a right half-screen displays image frames required by the left eye. Certainly, it is also possible that the left half-screen displays individually the image frames required by the left eye and the right half-screen displays individually the image frames required by the right eye. And in a practical application, the display screen may be a LCD display screen or a flexible OLED display screen. In the specification, words "left" and "right" are expressions both intending to facilitate descriptions more conveniently with reference to the directions as presented in attached drawings, rather than any limitation on contents of the embodiments of the disclosure.

Figure 2A:
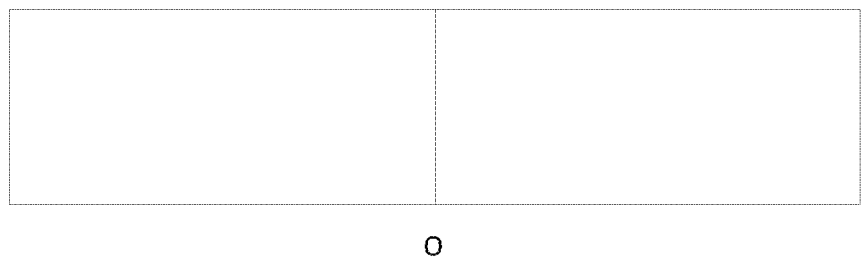
FIG. 2(a) illustrates a front view of a display screen according to an exemplary embodiment of the disclosure.
Figure 2B:
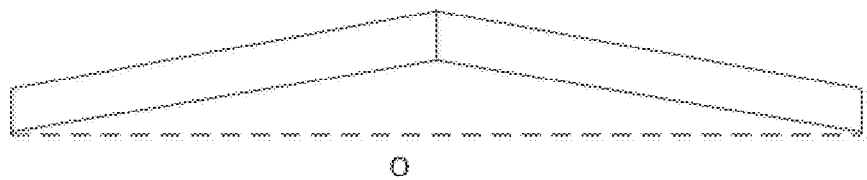
FIG. 2(b) illustrates a top view of the display screen according to an exemplary embodiment of the disclosure.

Specific shape of the display screen in which the left half-screen and the right half-screen are provided symmetrically may vary depending on different manufacturing processes for the display screen, and may be rectangle, round, or irregular pattern, and the like. In a condition that the left half-screen and the right half-screen are both rectangles, e.g., as illustrated in FIG. 2(a), which illustrates in a front view that the left half-screen and the right half-screen are two rectangular screens distributed respectively on a left side and a right side, with a central axis being interposed therebetween. As may be known from the top view as illustrated in FIG. 2(b), there is a certain angle between the left half-screen and the right half-screen.

According to a general technical concept of the present disclosure, in an aspect of the embodiments of the disclosure, there is provided a naked-eye three-dimensional (3D) display method based on two half-screens, the two half-screens being configured to display respectively images corresponding to a left eye and a right eye of an observer respectively. The method comprises following steps:

detecting in a real-time manner distances between both ends of each row of pixels on each of the half-screens and a corresponding eye of the observer through which said each of the half-screens is viewed;

calculating light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed; and controlling light rays outputted from the displayed pixels to the corresponding eye through which said each of the half-screens is viewed, with a collimated light adjusting device, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed.

Figure 3:
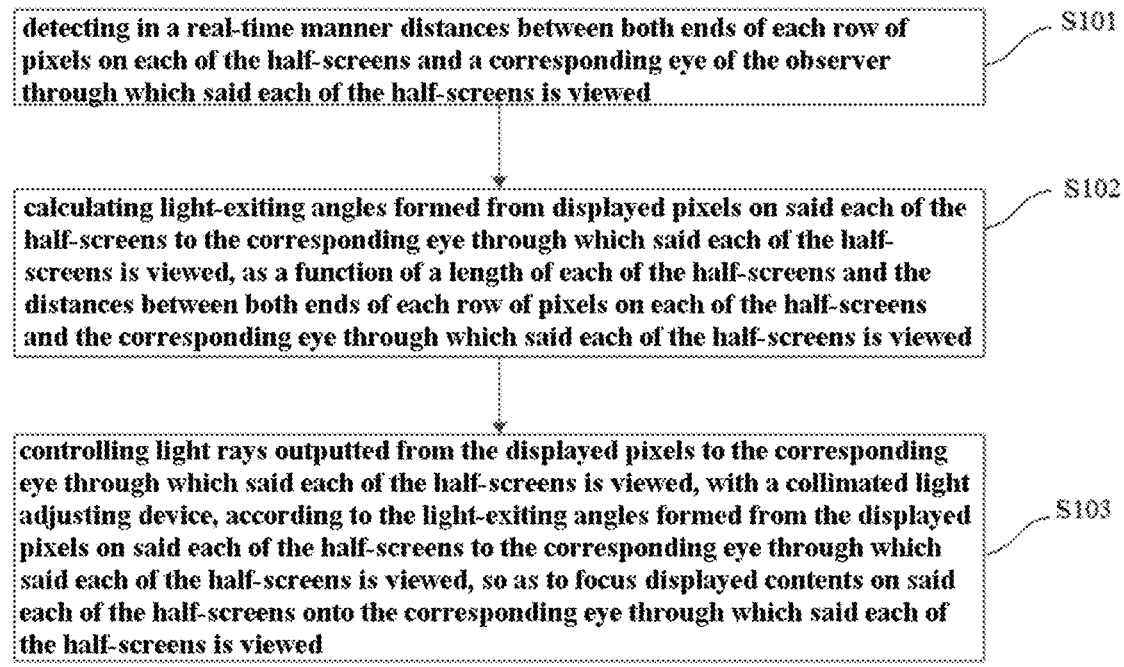
FIG. 3 illustrates a flow chart of a naked-eye 3D display method according to an exemplary embodiment of the disclosure.

Specifically, by way of example, FIG. 3 illustrates a flow chart of a naked-eye 3D display method according to an exemplary embodiment of the disclosure. As illustrated in FIG. 3, the method comprises:

Step S101: detecting in a real-time manner distances between both ends of each row of pixels on each of the half-screens and a corresponding eye of the observer through which said each of the half-screens is viewed.

Based on above discussion, it may be known that, a 3D display effect is relevant to distances between the eyes and the display screen; therefore, in the embodiment, the distances between both ends of each row of pixels on each of the half-screens and a corresponding eye of the observer through which said each of the half-screens is viewed may be detected in real-time, the distances detected in real-time comprising: distances between both ends of each row of pixels on the left half-screen and the right eye, and distances between both ends of each row of pixels on the right half-screen and the left eye; or alternatively, distances between both ends of each row of pixels on the right half-screen and the right eye, and distances between both ends of each row of pixels on the left half-screen and the left eye.

It should be noticed that, depending on different specific application scenarios, a detection of the distances between both ends of each row of pixels on each of the two half-screens and the corresponding eye of the observer through which said each of the half-screens is viewed may be implemented in different ways, for example, as below.

Figure 4A:
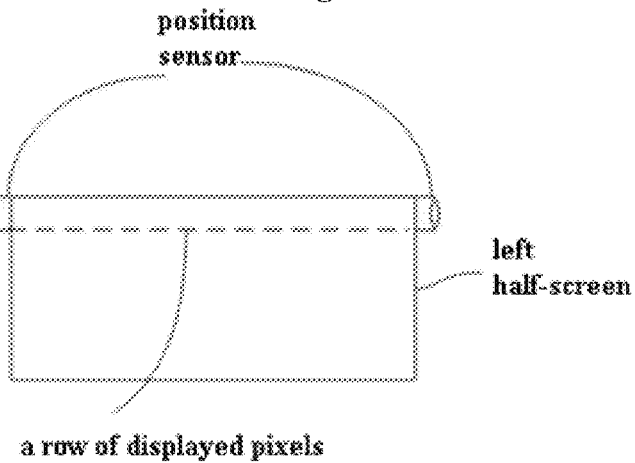
FIG. 4(a) illustrates a schematic view of a provision of position sensors at both ends of each row of pixels on a left half-screen according to an embodiment of the disclosure.

As illustrated in FIG. 4(a), in a condition that position sensors are provided at both ends of each row of pixels on a first half-screen (e.g., the left half-screen) and only one row of pixels are illustrated exemplarily, position sensors may also be provided at both ends of each row of pixels on a second half-screen (e.g., the right half-screen) in a way similar to the left side as before, without being repeated herein any more.

Furthermore, in an embodiment of the disclosure, by position sensors preset at both ends of each row of pixels on a first half-screen (e.g., the left half-screen), distances between both ends of each row of pixels on the first half-screen and the right eye are detected; and by position sensors preset at both ends of each row of pixels on a second half-screen (e.g., the right half-screen), distances between both ends of each row of pixels on the second half-screen and the left eye are detected.

In an alternative embodiment of the disclosure, by position sensors preset at both ends of each row of pixels on a second half-screen (e.g., the left half-screen), distances between both ends of each row of pixels on a first half-screen and the left eye are detected; and by position sensors preset at both ends of each row of pixels on the first half-screen (e.g., the right half-screen), distances between both ends of each row of pixels on the second half-screen and the right eye are detected.

Figure 4B:
FIG. 4(b) illustrates a schematic view of a provision of cameras at both ends of pixels on a half-screen according to an embodiment of the disclosure.

In another exemplary embodiment, as illustrated in FIG. 4(b), two or more cameras are provided on each of the half-screens, the two or more cameras being capable of detecting both ends of all pixels on each of the half-screens. As such, by the cameras preset on both sides of the first half-screen (e.g., the left half-screen), distances between both ends of each row of pixels and the right eye may be acquired; and by the cameras preset on both sides of the second half-screen (e.g., the right half-screen), distances between both ends of each row of pixels and the left eye may also be acquired.

In an alternative embodiment, by the cameras preset on both sides of the first half-screen (e.g., the left half-screen), distances between both ends of each row of pixels and the left eye may be acquired; and by the camera preset on both sides of the second half-screen (e.g., the right half-screen), distances between both ends of each row of pixels and the right eye may also be acquired.

The cameras may for example be infrared cameras, such that corresponding distance(s) may be calculated, as a function of a difference between an initial infrared signal which is initially emitted and an infrared signal reflected back by the corresponding eye.

And it should be emphasized especially in that, in the embodiment of the disclosure, a 3D display is implemented, based on a reference being the distances between both ends of each row of pixels on each of the half-screens and the corresponding eye through which said each of the half-screens is viewed; and in an alternative embodiment, in a practical application, depending on different calculating way for the 3D display, for example, the 3D display may also be implemented, based on a reference being the distances between both ends of each column of pixels on each of the half-screens and the corresponding eye through which said each of the half-screens is viewed.

Step S102: calculating light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed.

Figure 5:
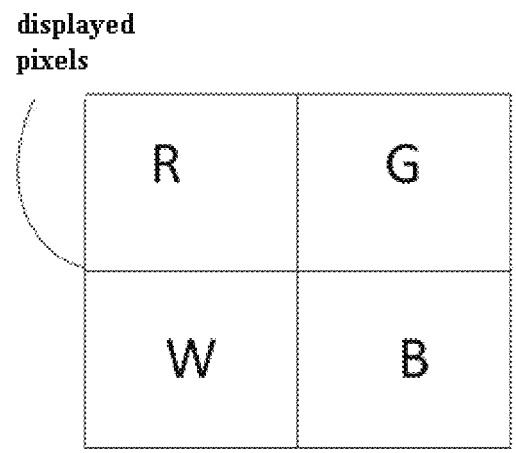
FIG. 5 illustrates a composition of displayed pixels according to an embodiment of the disclosure.

Each of the displayed pixels may for example comprise a unit pixel, or alternatively sub-pixels in a unit pixel, i.e., as illustrated in FIG. 5, in a condition that one display unit is a collection formed by four sub-pixels R, G, B, W collectively, then each of the displayed pixel may be any one sub-pixel of the sub-pixels R, G, B, W.

It should be perceived that, the length of each of the half-screens and the distances between both ends of each row of pixels on each of the half-screens and the corresponding eye through which said each of the half-screens is viewed may cooperate with each other to determine collectively the light-exiting angles formed from the displayed pixels to the corresponding eye through which said each of the half-screens is viewed. Thereby, for example, by controlling the light-exiting angles formed from the displayed pixels to the corresponding eye through which said each of the half-screens is viewed, it may be ensured that images of the right half-screen may only be seen by the left eye while images of the left half-screen may only be seen by the right eye; or alternatively, images of the left half-screen may only be seen by the left eye while images of the right half-screen may only be seen by the right eye.

As to influence on the light-exiting angles by the length of each of the half-screens and the distances between both ends of each row of pixels on each of the half-screens and the corresponding eye through which said each of the half-screens is viewed, for clarity in depiction thereof, the light-exiting angles of a row of pixels are exemplified as an example hereinafter, in view of specific application scenarios.

Figure 6A:
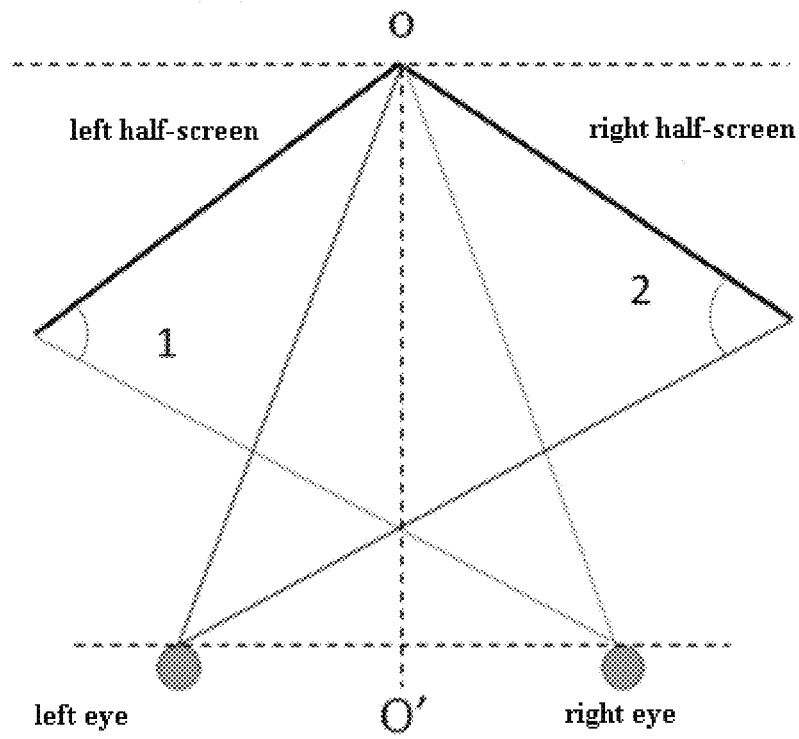
FIG. 6(a) illustrates a schematic diagram of an optical path at a light-exiting angle according to an embodiment of the disclosure.

As illustrated in FIG. 6(a), light rays emitted by the left half-screen may be irradiated towards the right eye, and light rays emitted by the right half-screen may be irradiated towards the left eye. In a condition that a central location between the left eye and the right eye is just on a central axis O which divides the display screen into the left half-screen and the right half-screen, in order to ensure the left eye may only see images of the right half-screen and the right eye may only see images of the left half-screen, then, light-exiting angles 1 of the left half-screen may be substantially equal to light-exiting angles 2 of the right half-screen.

Figure 6B:
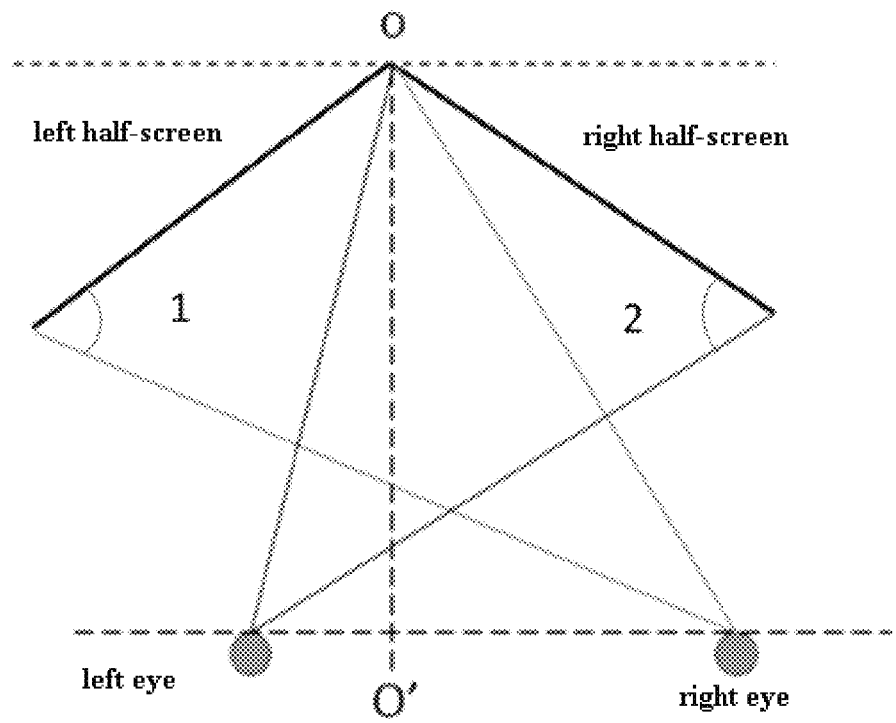
FIG. 6(b) illustrates a schematic diagram of an optical path at a light-exiting angle according to another embodiment of the disclosure.

As illustrated in FIG. 6(b), light rays emitted by the left half-screen may be irradiated towards the right eye, and light rays emitted by the right half-screen may be irradiated towards the left eye. In a condition that the central position between the left eye and the right eye is at a position deviating to right of the central axis O which divides the display screen into the left half-screen and the right half-screen (i.e., a center-right position between the left half-screen and the right half-screen), in order to ensure the left eye may only see images of the right half-screen and the right eye may only see images of the left half-screen, then, the light-exiting angles 1 of the left half-screen may be smaller than that in case that the central position between the left eye and the right eye is on the central axis O; this is because that, if light rays are still emitted at original light-exiting angles, then a portion of pixels of the left half-screen may be projected between the left eye and the right eye such that a portion of images may be missing so as not to form complete 3D images, i.e., resulting in a distortion in the 3D images. Based on a same or similar principle, the light-exiting angles 2 of the right half-screen may be larger than that in case that the central position between the left eye and the right eye is on the central axis O.

Figure 6C:
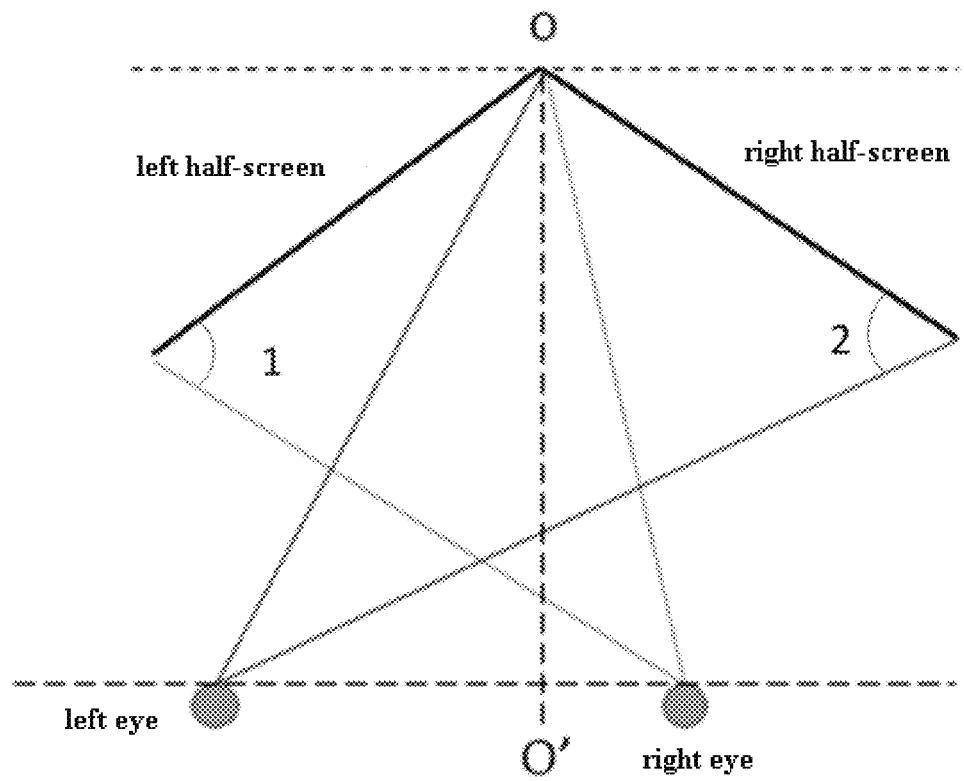
FIG. 6(c) illustrates a schematic diagram of an optical path at a light-exiting angle according to still another embodiment of the disclosure.

As illustrated in FIG. 6(*c*), light rays emitted by the left half-screen may be irradiated towards the right eye, and light rays emitted by the right half-screen may be irradiated towards the left eye. In a condition that the central position between the left eye and the right eye is at a position deviating to left of the central axis O which divides the display screen into the left half-screen and the right half-screen (i.e., a center-left position between the left half-screen and the right half-screen), in order to ensure the left eye may only see images of the right half-screen and the right eye may only see images of the left half-screen, then, light-exiting angles 1 of the left half-screen may be larger than that in case that the central position between the left eye and the right eye is on the central axis O; this is because that, if light rays are still emitted at original light-exiting angles, then a portion of pixels of the right half-screen may be projected between the left eye and the right eye such that a portion of images may be missing so as not to form complete 3D images, i.e., resulting in a distortion in the 3D images. Based on a same or similar principle, light-exiting angles 2 of the right half-screen may be smaller than that in case that the central position between the left eye and the right eye is on the central axis O.

Therefore, in the naked-eye 3D display method according to an embodiment of the disclosure, a viewing angle when the observer views continuously or uninterruptedly may then be maximized, by controlling the light-exiting angles in real-time.

It should be emphasized that, in above examples, it is exemplified that the left eye may merely see the images of the right half-screen and the right eye may merely see the images of the left half-screen; in other examples, as to conditions in which the left eye may merely see the images of the left half-screen and the right eye may merely see the image of the right half-screen, a similar processing way may be adopted, without being repeated herein any more.

Specifically, depending on different application scenarios, different operation methods may be adopted, i.e., the light-exiting angles formed from displayed pixels on said each of the half-screens to the corresponding eye through which said each of the half-screens is viewed may be calculated, as a function of the length of each of the half-screens and the distances between both ends of each row of pixels on each of the half-screens and the corresponding eye through which said each of the half-screens is viewed. Specific embodiments may be set forth exemplarily hereinafter.

Figure 7:
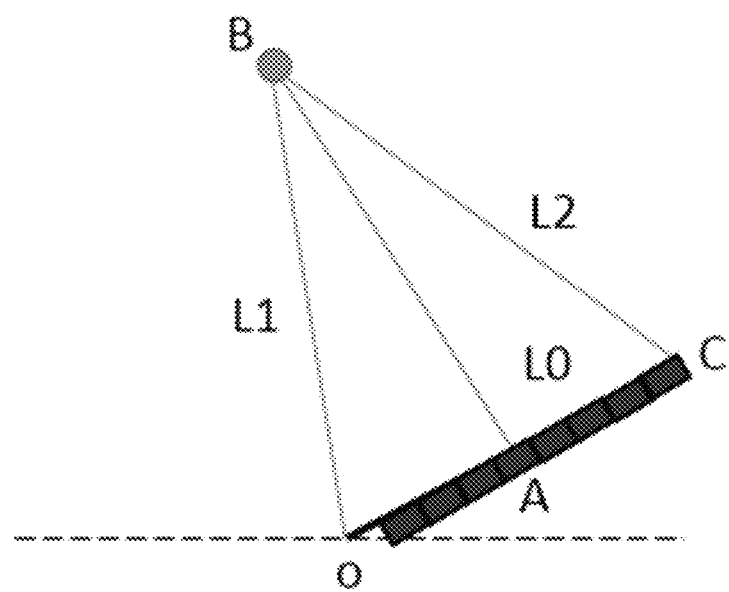
FIG. 7 illustrates a schematic diagram showing a triangle relationship formed between a length of a half-screen and distances from both ends of each row of pixels on a half-screen to an eye through which a corresponding one of the half-screens is viewed, according to an embodiment of the disclosure.

As an exemplary implementation, a row of pixels is taken as an example, as illustrated in FIG. 7, there is a geometrical triangle correspondence relationship formed between the length OC of each of the half-screens, and distances L1 and L2 from both ends of each row of pixels on each of the half-screens to a corresponding eye through which said each of the half-screens is viewed; and depending on the triangle correspondence relationship, the light-exiting angles formed from the displayed pixels to the corresponding eye through which said each of the half-screens is viewed may then be calculated.

As another exemplary implementation, since in a practical application, the observer may view through the display screen in a certain range, e.g., the observer may see indoors. Therefore, it is possible that, the correspondence relationship between the distances between both ends of each row of pixels on each of the half-screens and the corresponding eye through said each of the half-screens is viewed and the light-exiting angles of each row of pixels on said each of the half-screens may be obtained in advance and then stored. And then, after the distances between both ends of each row of pixels on each of the half-screens and the corresponding eye through which said each of the half-screens is viewed are obtained, the correspondence relationship may be inquired so as to obtain the light-exiting angles formed from the displayed pixels to the corresponding eye through which said each of the half-screens is viewed.

Step S103: controlling light rays outputted from the displayed pixels to the corresponding eye through which said each of the half-screens is viewed, with a collimated light adjusting device, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed.

Finally, the images acquired by both the left eye and the right eye may be fused together by superposition therebetween by the brain of the observer so as to form 3D frames of the images.

The collimated light adjusting device may be used in different application scenarios, e.g., it may be chosen from different devices such as a liquid crystal prism and a micro-electromechanical system (abbreviated as MEMS), and the like.

In an embodiment, for a clearer illustration, of processes of implementing a control of the light rays of the display pixels to transmit to the corresponding eye through which said each of the half-screens is viewed, by the collimated light adjusting device, conditions in each of which one of the liquid crystal prism, MEMS, and the like may be selected to function respectively as the collimated light adjusting device are taken as examples hereinafter, respectively.

In an example, an ideal condition in which the left eye may only see the images of the right half-screen and the right eye may only see the images of the left half-screen is taken as an example, as illustrated in FIG. 8(*a*), in case that the collimated light adjusting device is the liquid crystal prism, then, as to the left half-screen, a rotational direction and the like of the liquid crystal prism at a position corresponding to an optical path of the left half-screen may be adjusted, such that light rays may exit at the light-existing angles formed from the displayed pixels to the corresponding eye through which said left half-screen is viewed (here, i.e., the right eye) so as to control the light rays outputted from the displayed pixels to the right eye; as such, displayed contents on the left half-screen (e.g., all the displayed contents thereon) may be focused onto the right eye. Similarly, as illustrated in FIG. 8(b), in case that the collimated light adjusting device is the liquid crystal prism, then, as to the right half-screen, a rotational direction and the like of the liquid crystal prism at a position corresponding to an optical path of the right half-screen may be adjusted, such that light rays may exit at the light-existing angles formed from the displayed pixels to the corresponding eye through which said right half-screen is viewed (here, i.e., the left eye) so as to control the light rays outputted from the displayed pixels to the left eye; as such, displayed contents on the right half-screen (e.g., all the displayed contents thereon) may be focused onto the left eye. Thereby, the images acquired by both the left eye and the right eye may be fused together by superposition therebetween by the brain of the observer so as to form 3D frames of the images.

Figure 8A:
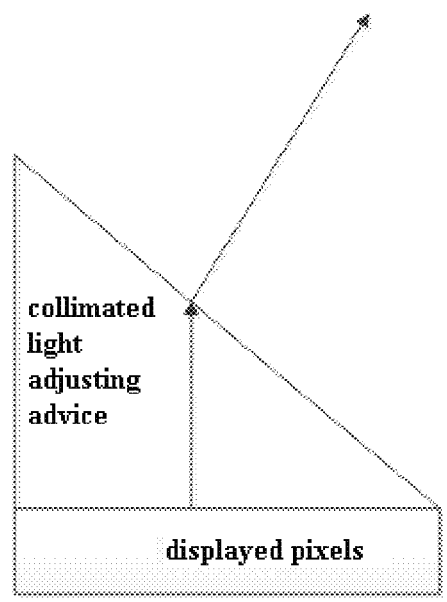
FIG. 8(a) illustrates a schematic diagram of an adjustment of a light-exiting angle by a liquid crystal prism, according to an embodiment of the disclosure.
Figure 8B:
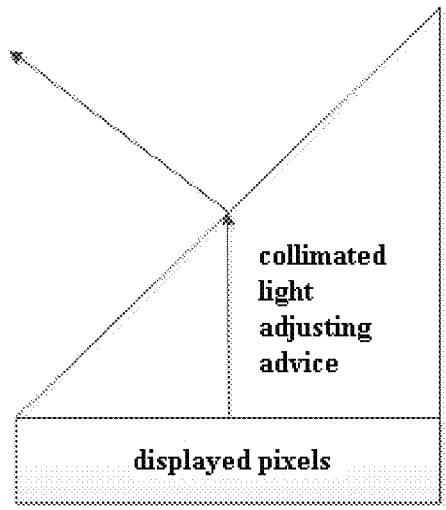
FIG. 8(b) illustrates a schematic diagram of an adjustment of a light-exiting angle by a liquid crystal prism, according to another embodiment of the disclosure.
Figure 8C:
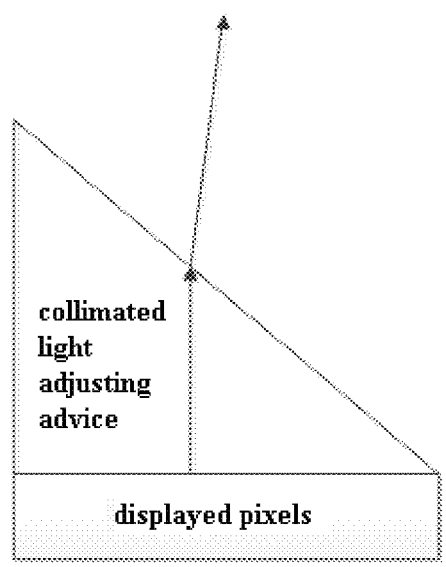
FIG. 8(c) illustrates a schematic diagram of an adjustment of a light-exiting angle by a liquid crystal prism, according to still another embodiment of the disclosure.
Figure 8D:
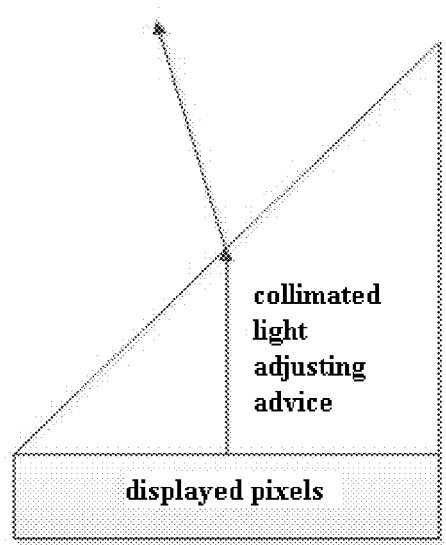
FIG. 8(d) illustrates a schematic diagram of an adjustment of a light-exiting angle by a liquid crystal prism, according to yet another embodiment of the disclosure.

In an alternative example, an ideal condition in which the left eye may only see the images of the left half-screen and the right eye may only see the images of the right half-screen is taken as an example, as illustrated in FIG. 8(c), in case that the collimated light adjusting device is the liquid crystal prism, then, as to the left half-screen, a rotational direction and the like of the liquid crystal prism at a position corresponding to an optical path of the left half-screen may be adjusted, such that light rays may exit at the light-existing angles formed from the displayed pixels to the corresponding eye through which said left half-screen is viewed (here, i.e., the left eye) so as to control the light rays outputted from the displayed pixels to the left eye; as such, displayed contents on the left half-screen (e.g., all the displayed contents thereon) may be focused onto the left eye. Similarly, as illustrated in FIG. 8(d), in case that the collimated light adjusting device is the liquid crystal prism, then, as to the right half-screen, a rotational direction and the like of the liquid crystal prism at a position corresponding to an optical path of the right half-screen may be adjusted, such that light rays may exit at the light-existing angles formed from the displayed pixels to the corresponding eye through which said right half-screen is viewed (here, i.e., the right eye) so as to control the light rays outputted from the displayed pixels to the right eye; as such, displayed contents on the right half-screen (e.g., all the displayed contents thereon) may be focused onto the right eye. Thereby, the images acquired by both the left eye and the right eye may be fused together by superposition therebetween by the brain of the observer so as to form 3D frames of the images.

And in a condition that the collimated light adjusting device is MEMS, then, by turning on and off a MEMS light valve at a corresponding location, the MEMS may be switched between a condition in which the light rays are blocked and a condition in which the light rays are outputted. As such, the light-exiting angles of the displayed pixels may be controlled by turning on and off the MEMS light valve, so as to control a light output from the displayed pixels to the corresponding eye through which that each of the half-screens is viewed.

Figure 9:
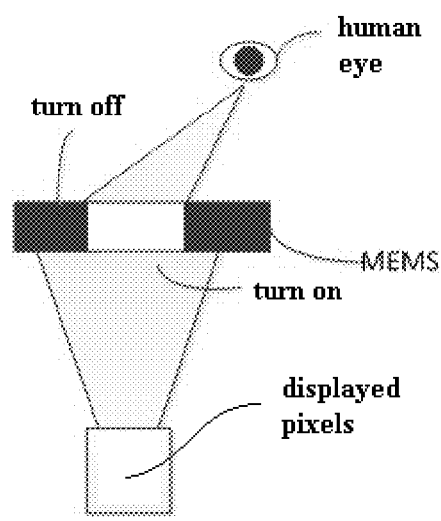
FIG. 9 illustrates a schematic diagram of an adjustment of a light-exiting angle by a MEMS light valve, according to an embodiment of the disclosure.

By way of example, as illustrated in FIG. 9, a column of displayed pixels is taken as an example. When the column of displayed pixels emits light rays, then, a direction of an optical path of the light rays may be guided by turning on and off the MEMS light valve at the corresponding position, such that the light rays may exit at the corresponding light-exiting angles.

Thereby, in the naked-eye 3D display method according to an embodiment of the disclosure, specifically, it applies on a display screen which is for example dividable along its own central axis into two half-screens that are symmetrically pivotable around the central axis. Such a screen may be folded into two halves, i.e., into a left half-screen and a right half-screen between which there is a certain angle. By detecting in a real-time manner positions of the eyes by a position and distance detection circuit, and adjusting the light-exiting directions of the display pixels in real time by the collimated light adjusting device, it is ensured that light rays emitted by the left half-screen and the right half-screen respectively may enter corresponding eyes through which the left half-screen and the right half-screen are viewed respectively, such that the naked-eye 3D frames of the images may be seen in real time by the eyes. The method adopts a simple structure with a relatively low cost, without any complicated sensing system, and may enhance comfort of the observer in use without any relatively heavy apparatus/device; in addition, as compared with a conventional naked-eye 3D display, the naked-eye 3D display according to the embodiment of the disclosure has a smaller crosstalk during display and a larger viewing angle when the observer views continuously or uninterruptedly.

In conclusion, in the naked-eye 3D display method according to an embodiment of the disclosure, distances between both ends of each row of pixels on each of the half-screens and a corresponding eye of the observer through which said each of the half-screens is viewed may be detected in a real-time manner; light-exiting angles formed from displayed pixels on said each of the half-screens to the corresponding eye through which said each of the half-screens is viewed may be calculated, as a function of a length of each of the half-screens and the distances between both ends of each row of pixels on each of the half-screens and the corresponding eye through which said each of the half-screens is viewed; and light rays outputted from the displayed pixels to the corresponding eye through which said each of the half-screens is viewed may be controlled, with a collimated light adjusting device, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed. Finally, the images acquired by both the left eye and the right eye may be fused together by superposition therebetween by the brain of the observer so as to form 3D frames of the images. Therefore, the viewing angle is extended when the observer views 3D images continuously or uninterruptedly, and the crosstalk during display is avoided, with a relatively low cost and an improved comfort of the observer in use.

Based on above embodiments, as to a problem which is intended to be solved concerning how to calculate light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed, for clarity in depiction thereof, a calculation of the corresponding light-exiting angles, which is based on the triangle correspondence relationship formed between the length of each of the half-screens and distances from both ends of each row of pixels on each of the half-screens to a corresponding eye through which said each of the half-screens is viewed, may be exemplified as an example hereinafter, in view of specific application scenarios.

FIG. 10 illustrates a flow chart of a naked-eye 3D display method according to another embodiment of the disclosure. As illustrated in FIG. 10, the method comprises:

Step S201: detecting in a real-time manner distances between both ends of each row of pixels on each of the half-screens and a corresponding eye through which said each of the half-screens is viewed.

Step S202: determining distances between the displayed pixels in each row of pixels on each of the half-screens and the axis, i.e., distances between each row of the displayed pixels on each of the half-screens and projection points of the central axis O on each row of the displayed pixels.

Specifically, since each displayed pixel is identical in size thereof, therefore, once the distances between the half-screen and both end points thereof after it pivots are known, then it may be determined the distances between the displayed pixels in each row of pixels on each of the half-screens and the axis, depending on specific arrangement sequences/orders of the pixels.

By way of example, current half-screen has 100 pixels, and a length of such half-screen is L, then, then, in each row of pixels, a pixel which is ordered as the second pixel from an end point at a distal end thereof away from the axis is located at a distance of (L/100)*99 from the axis.

Step S203: calculating distances between the displayed pixels in each row of pixels on each of the half-screens and the corresponding eye through which said each of the half-screens is viewed, as a function of the length of the half-screen, the distances between both ends of each row of pixels on each of the half-screens and the corresponding eye through which said each of the half-screens is viewed, and the distances between the displayed pixels in each row of pixels on each of the half-screens and the axis. For example, such a calculation is implemented by applying a triangle cosine theorem.

Specifically, after the distances between the displayed pixels in each row of pixels on each of the half-screens and the axis are obtained, depending on the length of the half-screen, the distances between both ends of each row of pixels on each of the half-screens and the corresponding eye through which said each of the half-screens is viewed, and the distances between the displayed pixels in each row of pixels on each of the half-screens and the axis, distances between the displayed pixels in each row of pixels on each of the half-screens and the corresponding eye through which said each of the half-screens is viewed may be calculated. For example, the calculation is implemented by applying the triangle cosine theorem.

Step S204: calculating light-exiting angles formed from displayed pixels in each row of pixels on said each of the half-screens to the corresponding eye through which said each of the half-screens is viewed, as a function of the distances between the displayed pixels in each row of pixels on each of the half-screens and the corresponding eye through which said each of the half-screens is viewed. For example, the calculation is implemented by applying the triangle cosine theorem.

Specifically, since a triangle may be formed by distances between the displayed pixels in each row of pixels on said each of the half-screens and the corresponding eye through which said each of the half-screens is viewed, and distances between the said displayed pixels and one of the two end points of said each of the half-screens, and the corresponding eye, then, the light-exiting angles formed from displayed pixels in each row of pixels on said each of the half-screens to the corresponding eye through which said each of the half-screens is viewed may be calculated, as a function of the distances between the displayed pixels in each row of pixels on each of the half-screens and the corresponding eye through which said each of the half-screens is viewed, by applying the triangle cosine theorem.

It should be emphasized that, in a practical application, by purely controlling the light-exiting angles to accommodate changes of position(s) of the corresponding eye(s), it may be possible that a portion of the images may be blocked by the screen in response to the corresponding eye(s) being moved to a position or positions corresponding to a certain extent; in other words, in a condition that the corresponding eye is moved to a position corresponding to a limit range of an optical path at a current pivotal angle of the half-screen is detected, then, for example by adjusting a pivotal angle of the half-screen, it may be possible to return to a process of re-calculating the light-exiting angles formed from displayed pixels to the corresponding eye through which said each of the half-screens is viewed.

Figure 11A:
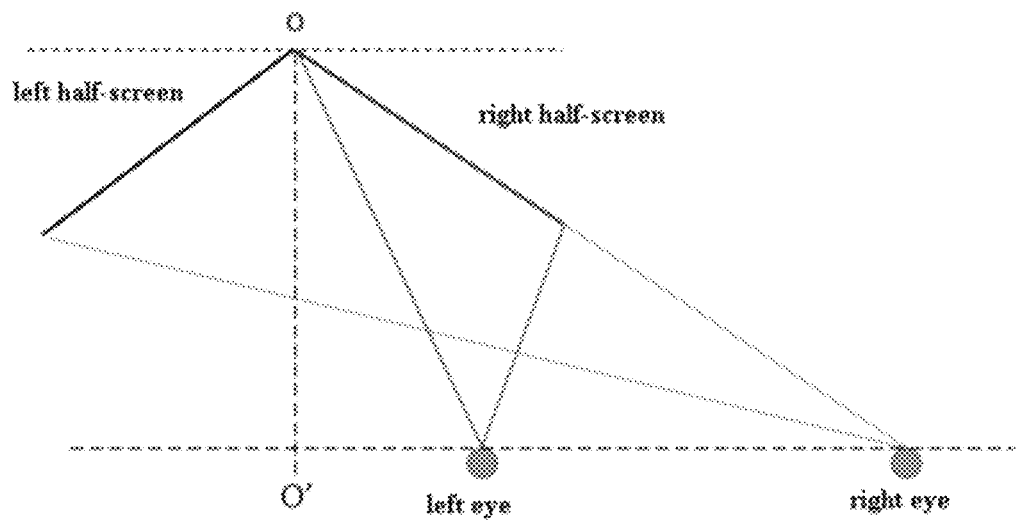
FIG. 11(a) illustrates a schematic diagram of an optical path in which a line of sight is blocked, according to an embodiment of the disclosure.
Figure 11B:
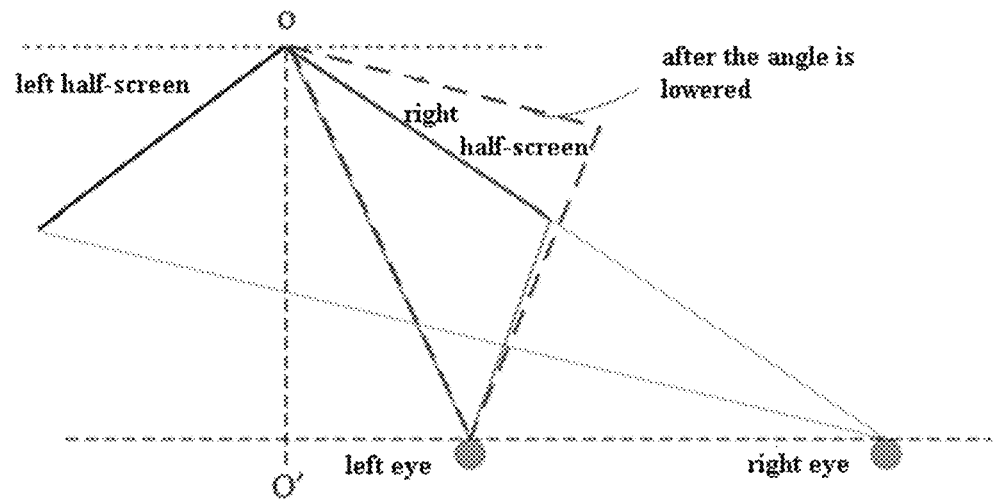
FIG. 11(b) illustrates a schematic diagram of an optical path in which a pivotal angle of the screen is adjusted, according to an embodiment of the disclosure.

By way of example, when the left half-screen displays image frames required by the right eye and the right half-screen displays image frames required by the left eye, as illustrated in FIG. 11(a), when the corresponding eye moves to a certain position deviating to right of the central axis of the display screen (i.e., a center-right position of the display screen), a line of sight from an extreme-right end of the right eye may be blocked by the right half-screen, and the right eye may merely receive incomplete images of the left half-screen at that time, or may even fail to receive images of the left half-screen (e.g., in a condition that the right half-screen has a relatively large thickness). Then, at that time, as illustrated in FIG. 11(b), by decreasing the pivotal angle of the right half-screen appropriately, i.e., by adjusting the right half-screen upwards, the light-exiting angles formed from displayed pixels of the right half-screen to the left eye through which the right half-screen is viewed may then be re-calculated. At that time, since the pivotal angle of the right half-screen decreases, the line of sight of the right eye may not be blocked, such that the images of the left half-screen may be seen completely clearly.

Figure 12A:
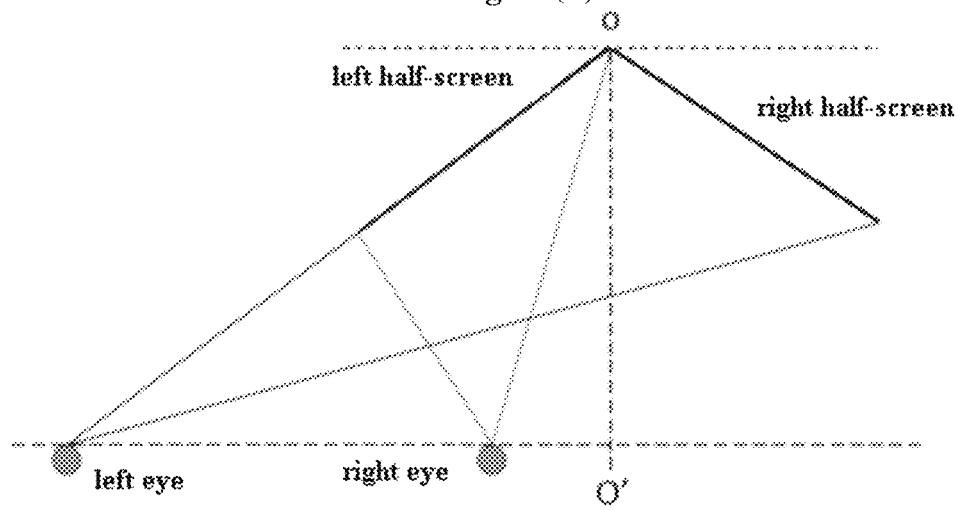
FIG. 12(a) illustrates a schematic diagram of an optical path in which a line of sight is blocked, according to another embodiment of the disclosure.
Figure 12B:
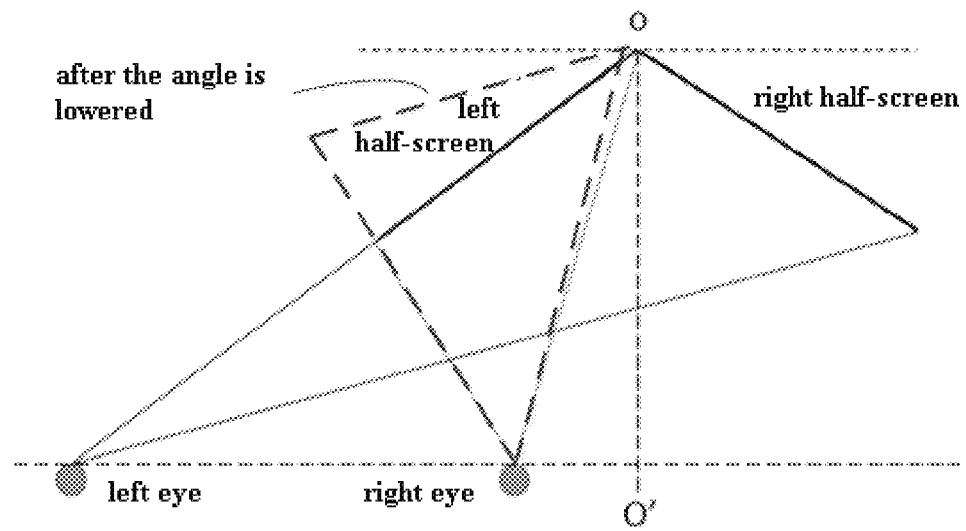
FIG. 12(b) illustrates a schematic diagram of an optical path in which a pivotal angle of the screen is adjusted, according to another embodiment of the disclosure.

As illustrated in FIG. 12(a), when the corresponding eye moves to a certain position deviating to left of the central axis of the display screen (i.e., a center-left position of the display screen), a line of sight from an extreme-left end of the left eye may be blocked by the left half-screen, and the left eye may merely receive incomplete images of the right half-screen at that time, or may even fail to receive images of the right half-screen. Then, at that time, as illustrated in FIG. 12(b), by decreasing the pivotal angle of the left half-screen appropriately, i.e., by adjusting the left half-screen upwards, the light-exiting angles formed from displayed pixels of the left half-screen to the right eye through which the left half-screen is viewed may then be re-calculated. At that time, since the pivotal angle of the left half-screen decreases, the line of sight of the left eye may not be blocked, such that the images of the right half-screen may be seen completely clearly.

Thereby, the naked-eye 3D display is implemented in a plurality of ways, which further extends the viewing angle when the observer views 3D images continuously or uninterruptedly, without any crosstalk during display, and the pivotable property of the display screen is fully taken advantages of, with a relatively high practical availability.

Step S205: controlling light rays outputted from the displayed pixels to the corresponding eye through which said each of the half-screens is viewed, with a collimated light adjusting device, according to the light-exiting angles formed from the displayed pixels on said each of the half-screens to the corresponding eye through which said each of the half-screens is viewed, so as to focus displayed contents of the first half-screen (e.g., the left half-screen) onto the right eye and to focus displayed contents of the second half-screen (e.g., the right half-screen) onto the left eye. Finally, the images acquired by both the left eye and the right eye may be fused together by superposition therebetween by the brain of the observer so as to form 3D frames of the images.

By way of example, when the left half-screen displays image frames required by the right eye and the right half-screen displays image frames required by the left eye, continuing to refer to FIG. 7, the width OC of each half-screen is labeled as L0, and the distances between both ends of the half-screens and a corresponding eye which are labeled as OB, OC respectively and detected by the position sensors (i.e., the distances between both ends of each row of pixels on each of the half-screens and the corresponding eye through which said each of the half-screens is viewed as above) are defined to be L1 and L2, respectively; and there are a plurality of displayed pixels in a single row direction of each of the half-screens whose number is P, and it is also provided that there is an angle θ defined between OB and OC. And on the basis of the triangle cosine theorem, it may be obtained an equation as below:

$$\cos\theta = \frac{OB^2 + OC^2 - BC^2}{2OB*OC} = \frac{L1^2 + L0^2 - L2^2}{2L1*L0}$$

As far as the triangle ΔAOB is concerned, provided that the displayed pixel located at point A is the Nth displayed pixel starting from a point O on the half-screen OC, then, there is an equation as below:

$$OA = \frac{N}{P}*OC = \frac{N}{P}*L0$$

It should be noted that, above distance OA is defined to be the distance between the displayed pixels in each row of pixels on each of the half-screens and the axis, i.e., the distance between the displayed pixels in each row of pixels on each of the half-screens and the projection points of the central axis O on each row of the displayed pixels, as discussed above.

And due to the relationship of $$\cos\theta = \frac{OB^2 + OA^2 - AB^2}{2OB*OA},$$

then, the distance labeled AB, i.e., the distance between the displayed pixels in each row of pixels on each of the half-screens and the corresponding eye through which said each of the half-screens is viewed, as discussed above, may be calculated; and then, an angle ∠BAC (i.e., one of the light-exiting angles formed from the displayed pixels in each row of pixels on said each of the half-screens to the corresponding eye through which said each of the half-screens is viewed, as discussed above) may also be calculated accordingly, such that the light-exiting angle at any displayed pixel may be calculated. As such, corresponding directions of the light rays outputted from the displayed pixels to the corresponding eye through which said each of the half-screens is viewed may be adjusted by the collimated light adjusting device based on the light-exiting angle at any displayed pixel, so as to focus the displayed contents of the left half-screen onto the right eye and to focus the displayed contents of the right half-screen onto the left eye. Finally, the images acquired by both the left eye and the right eye may be fused together by superposition therebetween by the brain of the observer so as to form 3D frames of the images.

In conclusion, in the naked-eye 3D display method according to an embodiment of the disclosure, the light-exiting angles formed from the displayed pixels on said each of the half-screens to the corresponding eye through which said each of the half-screens is viewed may be calculated, as a function of the geometrical triangle correspondence relationship formed between the length of each of the half-screens, and the distances from both ends of each row of pixels on each of the half-screens to a corresponding eye through which said each of the half-screens is viewed, with a relatively simple algorithm and a strong practical availability, further resulting in an enhanced 3D display rate and a decreased cost in 3D display.

In order to implement above embodiments, in another aspect of the embodiments of the disclosure, a naked-eye 3D display device is also provided, in an embodiment of the disclosure, for example comprising a display screen, which comprises a first half-screen and a second half-screen configured to display images respectively which are to be received by a left eye and a right eye of an observer respectively. The left half-screen displays image frames required by the right eye and the right half-screen displays image frames required by the left eye; or alternatively, the right half-screen displays image frames required by the right eye and the left half-screen displays image frames required by the left eye. The display screen comprises a pivotable display screen, e.g., a LCD display screen; or a pivotable display screen such as a flexible OLED display screen and the like. By way of example, the first half-screen and the second half-screen may divided by the axis provided on the display screen and may be pivotable around the axis, respectively. More specifically, e.g., the display screen may be divided along the central axis into two half-screens each of which is symmetrically pivotable around the central axis.

Figure 13:
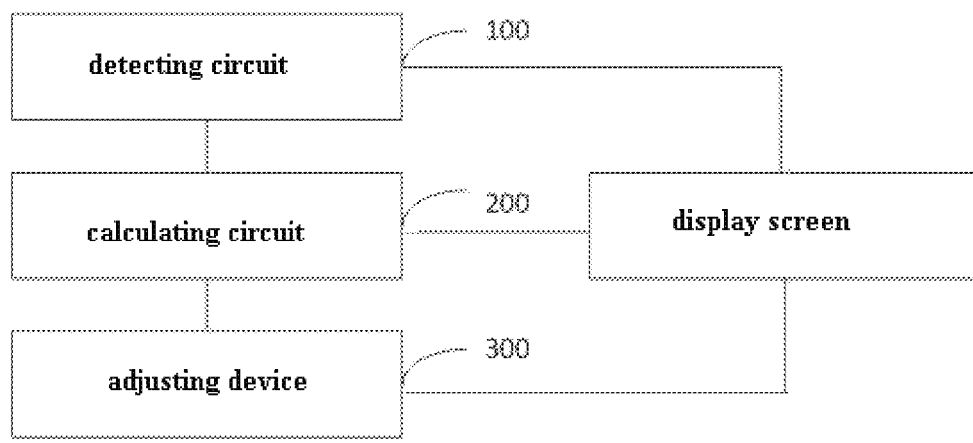
FIG. 13 illustrates a schematic structural view of a naked-eye 3D display device, according to an embodiment of the disclosure.

FIG. 13 illustrates a schematic structural view of a naked-eye 3D display device, according to an embodiment of the disclosure. As illustrated in FIG. 13, the device further comprises: a the display screen, a detecting circuit 100, a calculating circuit 200, and an adjusting device 300.

The display device comprises the first half-screen and the second half-screen configured to display images respectively which are to be received by a left eye and a right eye of the observer respectively.

And the detecting circuit 100 is configured to detect distances between both ends of each row of pixels on each of the half-screens and a corresponding eye of the observer through which said each of the half-screens is viewed, in real time.

In an embodiment of the disclosure, the detecting circuit 100 is specifically configured to detect distances between both ends of each row of pixels on the first half-screen (e.g., the left half-screen) and the right eye, by position sensors preset at both ends of each row of pixels on the first half-screen; and configured to detect distances between both ends of each row of pixels on the second half-screen (e.g., the right half-screen) and the left eye, by position sensors preset at both ends of each row of pixels on the second half-screen. In an alternative embodiment, the detecting circuit 100 is specifically configured to detect distances between both ends of each row of pixels on the first half-screen (e.g., the left half-screen) and the left eye, by position sensors preset at both ends of each row of pixels on the first half-screen; and configured to detect distances between both ends of each row of pixels on the second half-screen (e.g., the right half-screen) and the right eye, by position sensors preset at both ends of each row of pixels on the second half-screen.

The calculating circuit 200 is configured to calculate light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed The adjusting device 300 is configured to control light rays outputted from the displayed pixels to the corresponding eye through which said each of the half-screens is viewed, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed.

In a specific embodiment, for example, the adjusting device comprises a collimated light adjusting device.

In a further specific embodiment, for example, the collimated light adjusting device comprises one of a liquid crystal prism and a micro-electromechanical system.

It should be noticed that, the interpretation/depiction concerning the naked-eye 3D display method as above is also applicable to the naked-eye 3D display device according to the embodiment of the disclosure, based on a same or similar operation principle, without being repeated herein any more.

In conclusion, in the naked-eye 3D display device according to an embodiment of the disclosure, distances between both ends of each row of pixels on each of the half-screens and a corresponding eye of the observer through which said each of the half-screens is viewed may be detected in a real-time manner; light-exiting angles formed from displayed pixels on said each of the half-screens to the corresponding eye through which said each of the half-screens is viewed may be calculated, as a function of a length of each of the half-screens and the distances between both ends of each row of pixels on each of the half-screens and the corresponding eye through which said each of the half-screens is viewed; and light rays outputted from the displayed pixels to the corresponding eye through which said each of the half-screens is viewed may be controlled, with a collimated light adjusting device, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed. Finally, the images acquired by both the left eye and the right eye may be fused together by superposition therebetween by the brain of the observer so as to form 3D frames of the images. Therefore, the viewing angle is extended when the observer views 3D images continuously or uninterruptedly, and the crosstalk during display is avoided, with a relatively low cost and an improved comfort of the observer in use.

Figure 14:
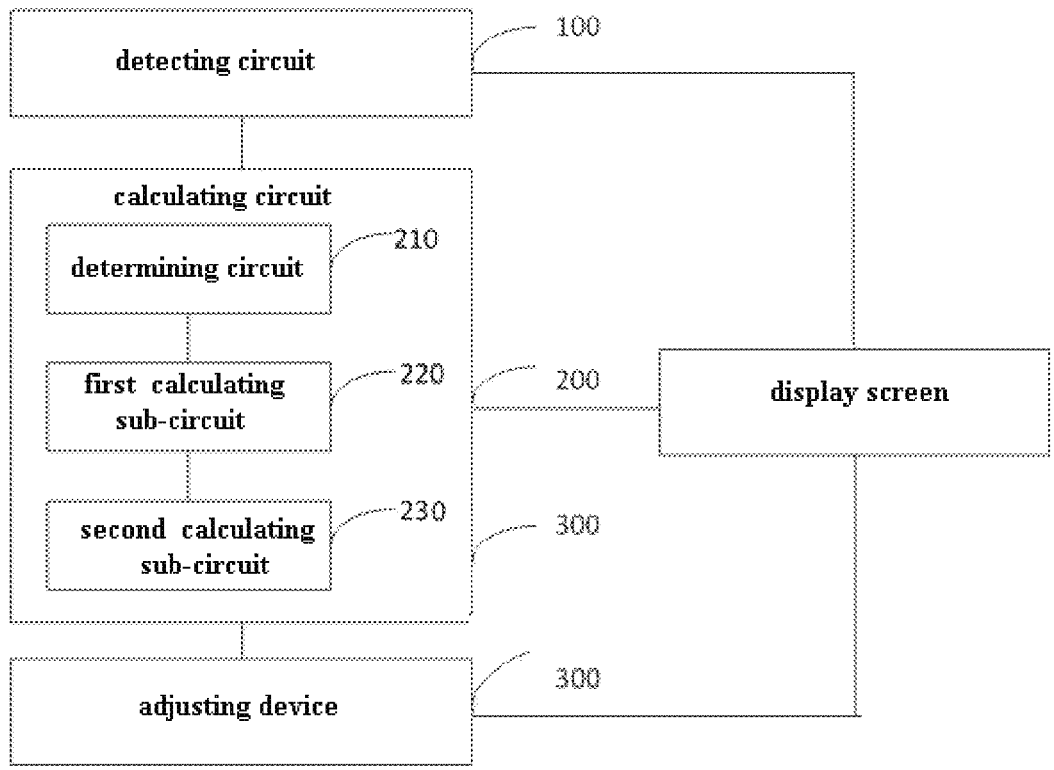
FIG. 14 illustrates a schematic structural view of a naked-eye 3D display device, according to another embodiment of the disclosure.

FIG. 14 illustrates a schematic structural view of a naked-eye 3D display device, according to another embodiment of the disclosure. As illustrated in FIG. 14, on the basis of FIG. 13, the calculating circuit 200 comprises: a determining circuit 210, a first calculating sub-circuit 220, and a second calculating sub-circuit 230.

The determining circuit 210 is configured to determine distances between the displayed pixels in each row of pixels on each of the half-screens and the axis.

The first calculating sub-circuit 220 is configured to calculate distances between the displayed pixels in each row of pixels on each of the half-screens and the corresponding eye through which said each of the half-screens is viewed, as a function of the length of the half-screen, the distances between both ends of each row of pixels on each of the half-screens and the corresponding eye through which said each of the half-screens is viewed, and the distances between the displayed pixels in each row of pixels on each of the half-screens and the axis. For example, such a calculation is implemented by applying a triangle cosine theorem.

The second calculating sub-circuit 230 is configured to calculate light-exiting angles formed from displayed pixels in each row of pixels on said each of the half-screens to the corresponding eye through which said each of the half-screens is viewed, as a function of the distances between the displayed pixels in each row of pixels on each of the half-screens and the corresponding eye through which said each of the half-screens is viewed. For example, such a calculation is implemented by applying a triangle cosine theorem.

In the embodiment, the adjusting device 300 is further configured to adjust a pivotal angle of the first half-screen or the second half-screen, in response to detecting that the corresponding eye is moved to a position corresponding to a limit range of an optical path at a current pivotal angle of the first half-screen or the second half-screen; and the calculating circuit 200 is further configured to re-calculate the light-exiting angles formed from the displayed pixels to the corresponding eye through which the first half-screen or the second half-screen is viewed.

In an exemplary embodiment, the display screen comprises one of a LCD display screen and a flexible OLED display screen.

It should be noticed that, the interpretation/depiction concerning the naked-eye 3D display method as above is also applicable to the naked-eye 3D display device according to the embodiment of the disclosure, based on a same or similar operation principle, without being repeated herein any more.

In conclusion, in the naked-eye 3D display device according to an embodiment of the disclosure, the light-exiting angles formed from the displayed pixels on said each of the half-screens to the corresponding eye through which said each of the half-screens is viewed may be calculated, as a function of the geometrical triangle correspondence relationship formed between the length of each of the half-screens, and the distances from both ends of each row of pixels on each of the half-screens to a corresponding eye through which said each of the half-screens is viewed, with a relatively simple algorithm and a strong practical availability, further resulting in an enhanced 3D display rate and a decreased cost in 3D display.

Figure 15:
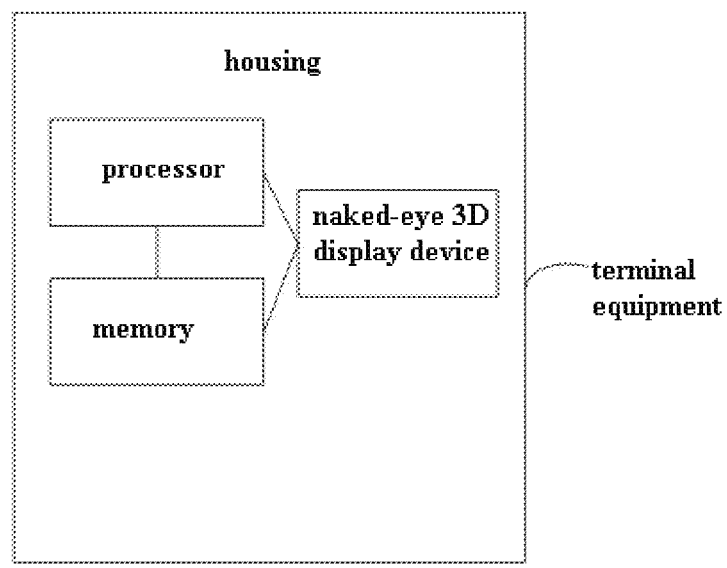
FIG. 15 illustrates a schematic structural view of a terminal equipment, according to an embodiment of the disclosure.

In order to implement above embodiments, in still another aspect of the embodiments of the disclosure, a terminal equipment is also provided, in an embodiment of the disclosure, comprising an apparatus whose display screen is pivotable, such as a smartphone, a television set and the like. FIG. 15 illustrates a schematic structural view of the terminal equipment, according to an embodiment of the disclosure. As illustrated in FIG. 15, the terminal equipment comprises: a housing; and a processor, a memory and a naked-eye three-dimensional display device which are located within the housing, wherein the processor is configured to run programs corresponding to executable program codes stored in the memory, by reading the executable program codes, so as to control the naked-eye three-dimensional display device to implement the naked-eye three-dimensional display method as depicted in above embodiments of the disclosure.

Figure 16:
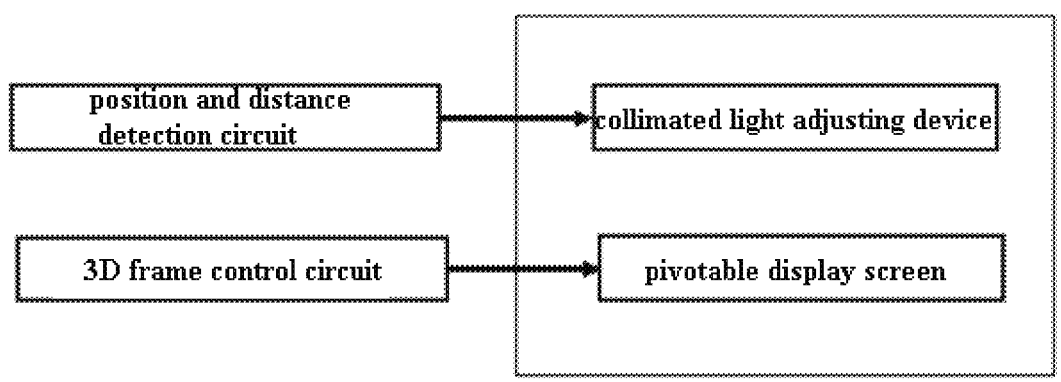
FIG. 16 illustrates a schematic view of a compositional structure of a naked-eye 3D display device, according to an embodiment of the disclosure.

In an embodiment of the disclosure, as illustrated in FIG. 16, the naked 3D display device comprises: a position and distance detection circuit, which is configured to detect distances between both ends of each row of pixels on each of the half-screens and the corresponding eye through which said each of the half-screens is viewed, in real time; and a collimated light adjusting device which is configured to control light rays outputted from the displayed pixels to the corresponding eye through which said each of the half-screens is viewed; a 3D frame control circuit and a pivotable display screen. When the pivotable display screen pivots, the 3D frame control circuit controls the left half-screen and the right half-screen respectively to display image frames required by the right eye and image frames required by the left eye, respectively.

In conclusion, the solutions of above embodiments of the disclosure have following beneficial technical effects: as to the naked-eye 3D display device, and the terminal equipment according to an embodiment of the disclosure, distances between both ends of each row of pixels on each of the half-screens and a corresponding eye of the observer through which said each of the half-screens is viewed may be detected in a real-time manner; light-exiting angles formed from displayed pixels on said each of the half-screens to the corresponding eye through which said each of the half-screens is viewed may be calculated, as a function of a length of each of the half-screens and the distances between both ends of each row of pixels on each of the half-screens and the corresponding eye through which said each of the half-screens is viewed; and light rays outputted from the displayed pixels to the corresponding eye through which said each of the half-screens is viewed may be controlled, with a collimated light adjusting device, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed. Finally, the images acquired by both the left eye and the right eye may be fused together by superposition therebetween by the brain of the observer so as to form 3D frames of the images. Therefore, the viewing angle is extended when the observer views 3D images continuously or uninterruptedly, and the crosstalk during display is avoided, with a relatively low cost and an improved comfort of the observer in use.

In the description of the embodiments of the disclosure, it should be perceived that, directional or positional relationships indicated by terms such as "center/central", "longitudinal", "transverse", "length", "width", "thickness", "above", "below", "front", "back", "left", "right", "vertical", "horizontal", "top", "bottom", "in", "out", "clockwise", "anticlockwise", "axial", "radial", "peripheral" and the like are based on corresponding directional or positional relationships as illustrated in the drawings, only intending to facilitate and simplify description of embodiments of the disclosure, rather than indicating or implying that referred device(s) or element(s) may necessarily have specific orientation(s), or be constructed/operated at the specific orientation(s); therefore, these directional or positional relationships may not be comprehended as a limitation on embodiments of the disclosure.

In addition, terms "first", "second" are merely used for depiction, rather than being comprehended to indicated or imply relative significance/importance or any specific number of technical features which are referred to herein. Therefore, features defined by "first" or "second" may explicitly or impliedly mean that at least one of the features may be included herein. In the depictions of embodiments of the disclosure, an expression "a plurality of" means at least two, e.g., two, three, and so on, unless it is defined specifically otherwise.

In embodiments of the disclosure, unless there may be definite provision and definition otherwise, terms "install", "connect", "mount" and the like may be comprehended in a broad sense, for example, it may refer to a fixed connection or a detachable connection, or an integration; and it may refer to a mechanical connection or an electrical connection; and it may also refer to a direct connection, or an indirect connection by an intermediate medium, or an internal communication or an interactional relationship between two elements, unless it is defined specifically otherwise. As to those skilled in the art, specific meanings of above terms in embodiments of the disclosure may be comprehended according to specific context herein.

In embodiments of the disclosure, unless may be definite provision and definition otherwise, a first feature provided "above" or "below" a second feature may mean that the first feature and the second feature are in a direct contact with each other, or the first feature and the second feature are in an indirect contact with each other through an intermediate medium. Moreover, the first feature provided "on" "above" or "over" may mean that the first feature is positioned right above or obliquely above the second feature, or merely mean that the first feature has a larger level/height than that of the second feature. The first feature provided "beneath", "below" or "under" may mean that the first feature is positioned right below or obliquely below the second feature, or merely mean that the first feature has a smaller level/height than that of the second feature.

In the description of the disclosure, depictions referring to terms "an embodiment", "embodiments", "example", "specific embodiment" or "specific embodiments" may mean that specific features, structures, materials or properties which are depicted in view of the embodiment(s) or example(s) are contained in at least one embodiment or example of the disclosure. In the description, schematic expressions concerning above terms may not necessarily be directed to identical embodiments or examples. Moreover, the specific features, structures, materials, or properties depicted may be combined in an appropriate manner in any one or more embodiment(s) or example(s). In addition, different embodiments or examples, and features in different embodiments or examples, as described in the disclosure may be combined with one another by those skilled in the art, without any confliction thereamong.

Although embodiments of the disclosure are already illustrated and depicted as above, it should be appreciated for those skilled in this art that the above embodiments are only exemplary embodiments intended to illustrate the operation principle of the disclosure, rather than being limited thereto. As to those skilled in the art, various variations and/or modifications may be made in these embodiments, without departing from the principles and spirit of the disclosure, and these variations and/or modifications still lie within the scope of present application.

What is claimed is:

1. A naked-eye three-dimensional display method constructed on a display screen which is divided along its own central axis into two half-screens, which are configured to display respectively images corresponding to a left eye and a right eye of an observer respectively, the method comprising:
    detecting in a real-time manner distances between both ends of each row of pixels on each of the half-screens and a corresponding eye of the observer through which said each of the half-screens is viewed;
    calculating light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed; and
    controlling light rays outputted from the displayed pixels to the corresponding eye through which said each of the half-screens is viewed, with a collimated light adjusting device, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed,
    wherein detecting in a real-time manner distances between both ends of each row of pixels on each of the half-screens and a corresponding eye of the observer through which said each of the half-screens is viewed comprising:
    detecting distances between both ends of each row of pixels on a first half-screen and the right eye, by position sensors preset at both ends of each row of pixels on the first half-screen; and
    detecting distances between both ends of each row of pixels on a second half-screen and the left eye, by position sensors preset at both ends of each row of pixels on the second half-screen.

2. The method according to claim 1, wherein the half-screens are pivotable with reference to the central axis, respectively.

3. The method according to claim 1, wherein the collimated light adjusting device comprises one of a liquid crystal prism and a micro-electromechanical system.

4. The method according to claim 2, wherein calculating light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed comprising:
    determining distances between the displayed pixels in each row of pixels on each of the half-screens and the central axis;
    calculating distances between the displayed pixels in each row of pixels on each of the half-screens and the corresponding eye through which said each of the half-screens is viewed, as a function of the length of the half-screen, the distances between both ends of each row of pixels on each of the half-screens and the corresponding eye through which said each of the half-screens is viewed, and the distances between the displayed pixels in each row of pixels on each of the half-screens and the central axis;
    calculating light-exiting angles formed from displayed pixels in each row of pixels on said each of the half-screens to the corresponding eye through which said each of the half-screens is viewed, as a function of the distances between the displayed pixels in each row of pixels on each of the half-screens and the corresponding eye through which said each of the half-screens is viewed.

5. The method according to claim 2, further comprising:
    adjusting a pivotal angle of the half-screen, in response to detecting that the corresponding eye is moved to a position corresponding to a limit range of an optical path at a current pivotal angle of the half-screen; and
    re-calculating the light-exiting angles formed from displayed pixels to the corresponding eye through which said each of the half-screens is viewed.

6. The method according to claim 2, wherein the two half-screens are arranged symmetrically about the central axis.

7. The method according to claim 1, wherein each of the pixels comprises one kind of a unit pixel, and sub-pixels in the unit pixel.

8. A naked-eye three-dimensional display device, comprising:
    a display screen, which comprises a first half-screen and a second half-screen both of which are obtained by division of the display screen along its own central axis and are configured to display images respectively which are to be received by a left eye and a right eye of an observer respectively,
    a detecting circuit, configured to detect in a real-time manner distances between both ends of each row of pixels on each of the half-screens and a corresponding eye of the observer through which said each of the half-screens is viewed;
    a calculating circuit, configured to calculate light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed
    an adjusting device, configured to control light rays outputted from the displayed pixels to the corresponding eye through which said each of the half-screens is viewed, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed,
    wherein the detecting circuit is further configured:
    to detect distances between both ends of each row of pixels on the first half-screen and the right eye, by position sensors preset at both ends of each row of pixels on the first half-screen; and
    to detect distances between both ends of each row of pixels on the second half-screen and the left eye, by position sensors preset at both ends of each row of pixels on the second half-screen.

9. The device according to claim 8, wherein the display screen is divided into the first half-screen and the second half-screen by the central axis provided on the display screen, and the first half-screen and the second half-screen are pivotable with reference to the central axis, respectively.

10. The device according to claim 8, wherein the adjusting device comprises a collimated light adjusting device.

11. The device according to claim 10, wherein the collimated light adjusting device comprises one of a liquid crystal prism and a micro-electromechanical system.

12. The device according to claim 9, wherein the calculating circuit comprises:
   a determining circuit, configured to determine distances between the displayed pixels in each row of pixels on each of the half-screens and the central axis;
   a first calculating sub-circuit, configured to calculate distances between the displayed pixels in each row of pixels on each of the half-screens and the corresponding eye through which said each of the half-screens is viewed, as a function of the length of the half-screen, the distances between both ends of each row of pixels on each of the half-screens and the corresponding eye through which said each of the half-screens is viewed, and the distances between the displayed pixels in each row of pixels on each of the half-screens and the central axis;
   a second calculating sub-circuit, configured to calculate light-exiting angles formed from displayed pixels in each row of pixels on said each of the half-screens to the corresponding eye through which said each of the half-screens is viewed, as a function of the distances between the displayed pixels in each row of pixels on each of the half-screens and the corresponding eye through which said each of the half-screens is viewed.

13. The device according to claim 9, wherein,
   the adjusting device is further configured to adjust a pivotal angle of the first half-screen or the second half-screen, in response to detecting that the corresponding eye is moved to a position corresponding to a limit range of an optical path at a current pivotal angle of the first half-screen or the second half-screen; and
   the calculating circuit is further configured to re-calculate the light-exiting angles formed from the displayed pixels to the corresponding eye through which the first half-screen or the second half-screen is viewed.

14. The device according to claim 8, wherein the first half-screen and the second half-screen are arranged symmetrically about the central axis.

15. The device according to claim 8, wherein the display screen comprises one of a LCD display screen and a flexible OLED display screen.

16. A terminal equipment, comprising:
   a housing; and
   a processor, a memory and a naked-eye three-dimensional display device which are located within the housing,
   wherein the processor is configured to run programs corresponding to executable program codes stored in the memory, by reading the executable program codes, so as to control the naked-eye three-dimensional display device to implement the naked-eye three-dimensional display method according to claim 1.

17. The terminal equipment according to claim 16, wherein the naked-eye three-dimensional display device comprises:
   a display screen, which comprises a first half-screen and a second half-screen configured to display images respectively which are to be received by a left eye and a right eye of an observer respectively,
   a detecting circuit, configured to detect in a real-time manner distances between both ends of each row of pixels on each of the half-screens and a corresponding eye of the observer through which said each of the half-screens is viewed;
   a calculating circuit, configured to calculate light-exiting angles formed from displayed pixels on said each of the half-screens to the corresponding eye through which said each of the half-screens is viewed, as a function of a length of each of the half-screens and the distances between both ends of each row of pixels on each of the half-screens and the corresponding eye through which said each of the half-screens is viewed
   an adjusting device, configured to control light rays outputted from the displayed pixels to the corresponding eye through which said each of the half-screens is viewed, according to the light-exiting angles formed from the displayed pixels on said each of the half-screens to the corresponding eye through which said each of the half-screens is viewed, so as to focus displayed contents on said each of the half-screens onto the corresponding eye through which said each of the half-screens is viewed.

* * * * *